J. B. RICHARDS.
AUTOMOBILE TOP.
APPLICATION FILED SEPT. 22, 1915.

1,199,497.

Patented Sept. 26, 1916.
2 SHEETS—SHEET 1.

WITNESS.
B. H. Seaver.

INVENTOR,
John B. Richards,
BY
Harry W. Bowen,
ATTORNEY.

J. B. RICHARDS.
AUTOMOBILE TOP.
APPLICATION FILED SEPT. 22, 1915.
1,199,497.
Patented Sept. 26, 1916.
2 SHEETS—SHEET 2.
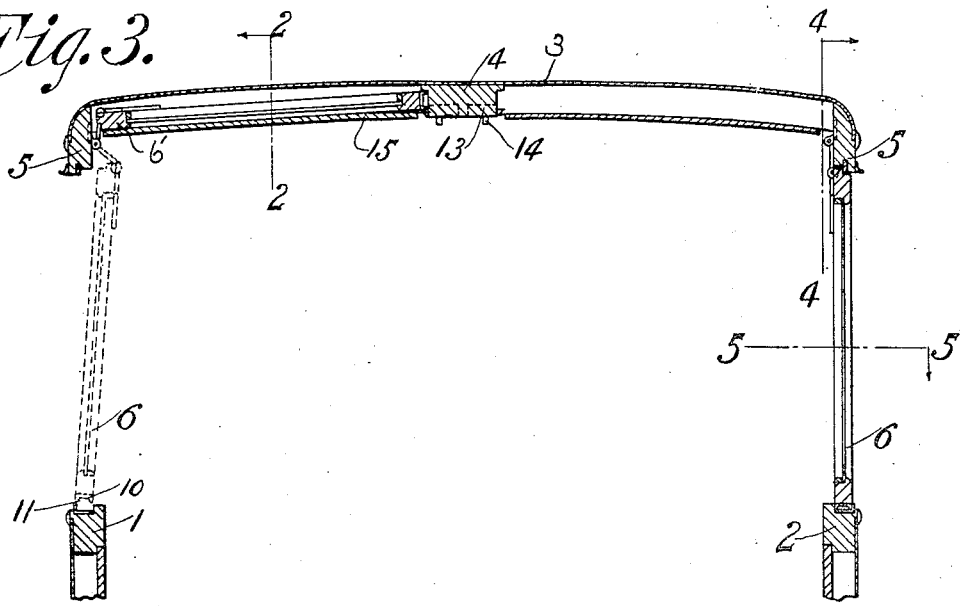
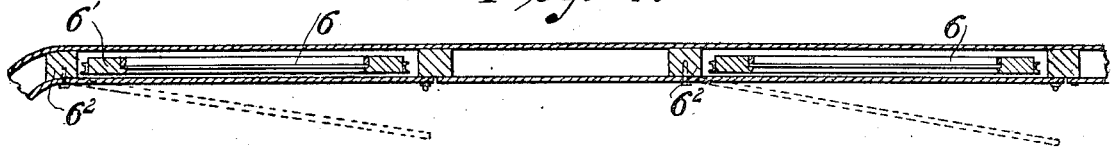
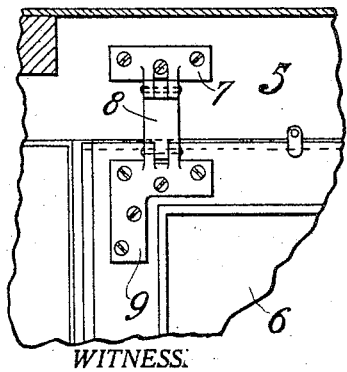
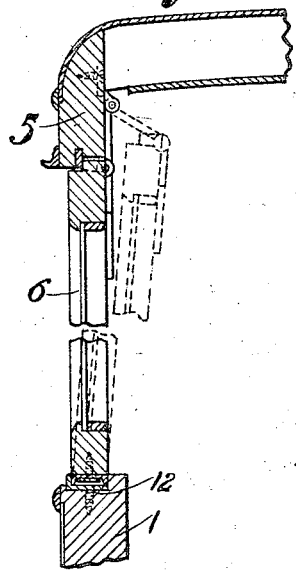
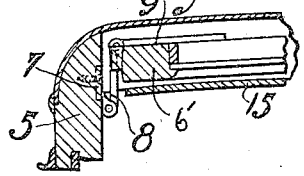
INVENTOR,
John B. Richards,
BY
Harry W. Bown,
ATTORNEY.

UNITED STATES PATENT OFFICE.

JOHN B. RICHARDS, OF SPRINGFIELD, MASSACHUSETTS.

AUTOMOBILE-TOP.

1,199,497.  Specification of Letters Patent.  Patented Sept. 26, 1916.

Application filed September 22, 1915. Serial No. 52,012.

*To all whom it may concern:*

Be it known that I, JOHN B. RICHARDS, a citizen of the United States of America, residing in the city of Springfield, county of Hampden, and State of Massachusetts, have invented certain new and useful Improvements in Automobile-Tops, of which the following is a specification.

This invention relates to improvements in automobile tops, particularly those having a permanent top, known in the trade as limousines.

An object of the invention is to provide means for readily and easily folding the side windows from a vertical or closed position upward into a horizontal or open position in the top of the roof of the automobile body.

A further object of the invention is to provide means or devices for permitting the upper part of the window frame to be swung inward before the lower part is raised from its seat, and a further object is to provide means for covering the window frame with a flap or cloth when the same is secured in place in the upper part of the automobile body.

In automobile bodies of the closed type it is often convenient to have the upper side portions of the body open and free from obstructions for observation or ventilation purposes and a convenient means of accomplishing this purpose forms the subject matter of this application and my copending application filed of even date herewith.

Further objects of the nature of the invention will appear in the body of the specification and will be particularly pointed out in the claims.

Figure 1:
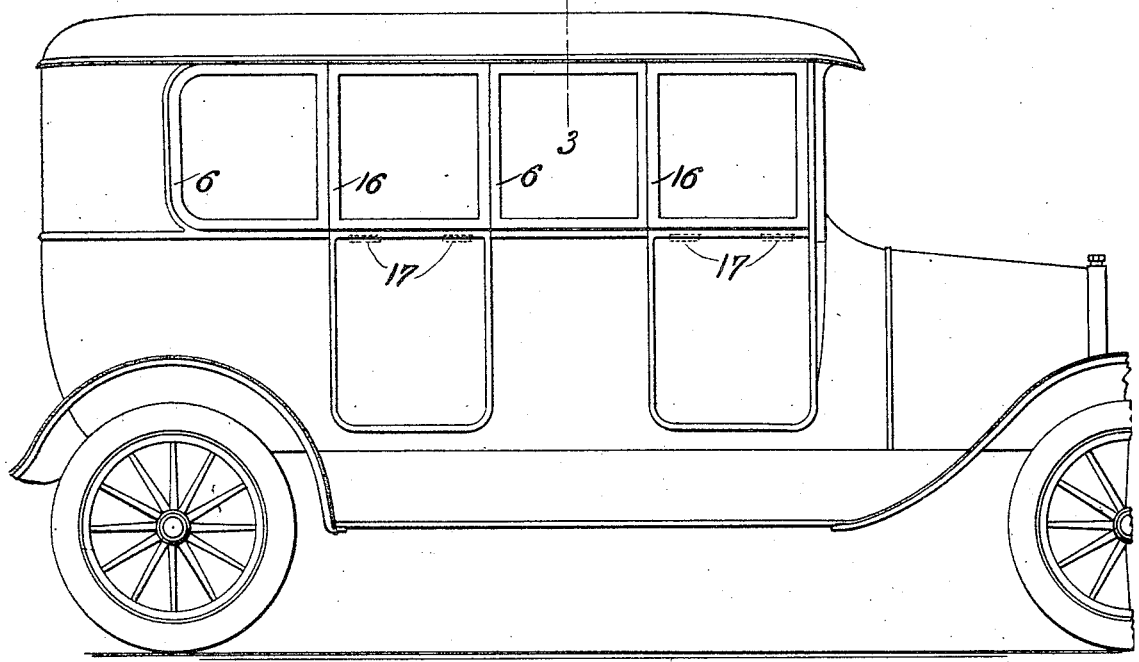
Figure 2:
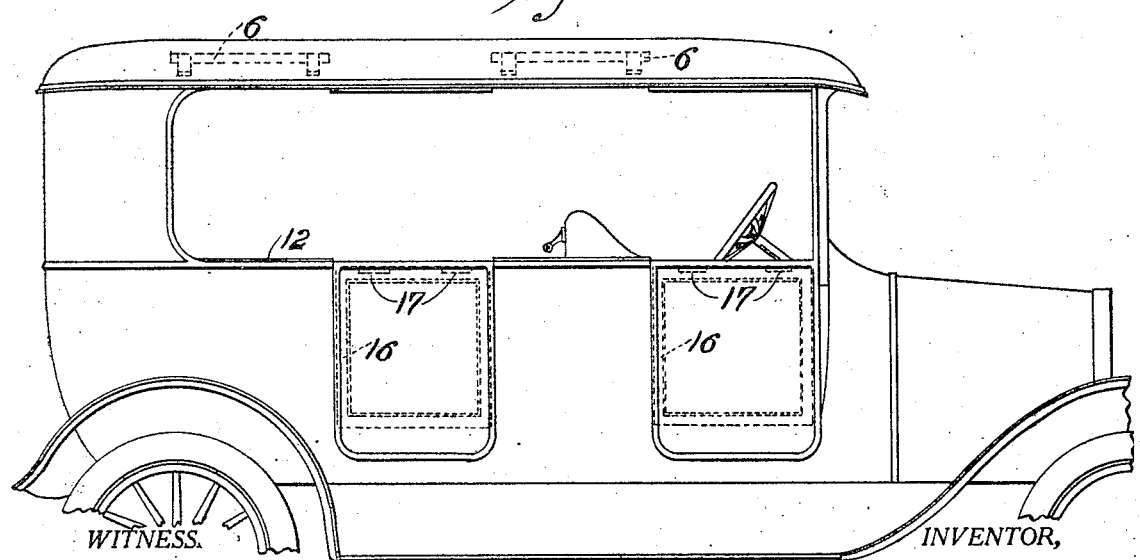

Referring to the drawings—Figure 1 is a side elevational view of an automobile body showing the upper part of the body entirely closed by the window and door frames; Fig. 2 is a view similar to Fig. 1 but showing the upper part of the body open, the window frames having been swung upward into the roof, and the door frames downward into the lower part of the door; Fig. 3 is a transverse sectional view of the upper portion of an automobile top of the limousine type on the line 3—3 of Fig. 1, showing a window frame in dotted lines before folding into the top, and, in full lines when in place; Fig. 4 is a vertical sectional view on the line 2—2 of Fig. 3, showing a portion of the top and two window frames in place, when folded into the top; Fig. 5 is a horizontal sectional view on the line 5—5 of Fig. 3 looking in the direction of the arrow and showing two window frames and one door frame in full lines; Fig. 6 is a detail view of the double-jointed hinge for pivotally connecting the window frame to the top plate; Fig. 7 is a detail view showing the manner of removing the window frame from its vertical position; and Fig. 8 is a detail view showing the manner of folding the window frame, on its hinge, upward into the top.

Referring to the drawings in detail—1 and 2 designate the opposite sides of the car body, 3 the roof portion having the longitudinally extending rib or bracing piece 4; the upper side rails are shown at 5. The window frames are shown at 6, which are pivotally connected to the upper rails 5 by means of the three leaf or double pivoted hinges which consist of the leaves 7, 8, and 9, the leaves 7 and 9 being secured to the rails 5 and window frames 6, as shown. The intermediately located leaves 8 normally hang in a vertical position against the inner side of the rail 5. The lower edge of the window is formed with the parallel beaded edges 10 and 11 which rest on the botton of the L-shaped channel angle iron 12. These edges may, if desired, be formed of rubber or other substance to prevent noise when the car is in motion.

In order to remove a window frame from its vertical or normal position shown at the right in Fig. 1, the operator draws the top of the frame inward as shown in dotted lines at the left in Figs. 3 and 7, this permits the bottom of the window to be lifted upward away from the angle-shaped iron 12, the double-jointed hinge permitting this removal since the leaf 8 turns on its pivotal connection with the fixed leaf 7. After removing the window frame from iron 12, the same can then be readily swung upward into the position shown in the roof of the automobile top, as shown in Figs. 3, 4, and 8. The frames are retained in place by means of the slidable latches 13 that are readily operated by means of the knobs 14. The double jointed hinge permits the edge 6' of the window frame to which this hinge is attached to be moved close to the upper side rail 5, as shown in Figs. 3 and 8. It will be seen from this construction that the occupant of the car can readily remove the window frames from their vertical position and lock them in the roof of the top.

In order to conceal the window frame when in its stored position, a flap or covering cloth 15 is provided which can be readily secured in place by any suitable means, as snap buttons of the glove fastener type, one end of the cloth being secured to the transverse ribs of the roof as shown at 6².

It is to be understood that all of the window frames in the side of the car body are equipped with the double-jointed hinges for folding and storing these frames upward into the roof of the car. It is also to be understood that the upper frame parts of the doors, as indicated at 16, in Figs. 1 and 5, are to be folded downward against the inside of the doors. This arrangement of folding the window frames upward into the roof of the car and the upper window frames 16 of the doors downward permits the entire upper part of the car body above the rails 1 to be opened from end to end and a clear and unobstructed view for the occupant from the wind shield of the car to the end of the car body adjacent the back of the rear seat, as clearly shown in Fig. 2. This construction permits the occupant of the car to readily make the change of opening and closing the windows 16 in the door frame and the windows 6 without being obliged to leave the car.

In Figs. 1 and 2 the hinges which connect the upper door frames 16 are indicated at 17, in Fig. 1 the frames are shown in a closed position; in Fig. 2 these frames 16 are shown in dotted lines in an open position. The particular hinge construction for retaining the frames 16 in either a closed or open position is not claimed in this application.

One of the great advantages of the present invention when considered in connection with my co-pending application is that the upper part of the body can be readily converted so that there is a clear and unobstructed side view from the wind shield to the rear seat of the body.

What I claim is:

1. In an automobile top of the limousine type, the combination with the windows in the upper portion of the body thereof, of means to permit the windows to be swung upward into the roof portion of the car, said means comprising a double jointed hinge connected to the upper side rail of the car body and the upper ends of the window frames, whereby the upper ends of the frames can be swung inward to permit removal of the lower ends of the frames from its position on the rails upon which the lower ends of the window frames rest, and whereby the frames may be swung into the roof portion of the car, and means comprising a flap or covering for concealing the window frames when swung into the roof of the car.

2. In an automobile body of the limousine type, the combination with the side window frames and upper window frames of the door, a double-hinge construction for folding the side window frames transversely upward into the roof of the car body, means for retaining the same in such folded position, hinges for connecting the upper part of the door frames to the doors for swinging said door frames downward against the lower inner side of the doors, whereby a clear and unobstructed open space from the front to the rear is obtained.

3. The combination with an automobile body of the limousine type, of window frames located in the upper portion thereof, means comprising a three leafed hinge to permit the window frames to be swung upward into and transversely of the roof, the upper leaf of the hinge being attached to the inner side of the top side rail, the middle leaf depending from the upper leaf, and the lower or third leaf being attached to the upper inner edge of the window frame, whereby the upper edge of the frame may be swung inward to permit the frame to be removed from its seat at its bottom and then swung upward transversely into the roof of the top, said hinge permitting the frame to be moved outward into a position adjacent the inner side of the top side rail, means for locking the frame in place, and means comprising a flap for covering the frame when in its elevated position.

JOHN B. RICHARDS.

Witness:
HARRY W. BOWEN.